(12) United States Patent
de Groot

(10) Patent No.: US 8,932,422 B2
(45) Date of Patent: Jan. 13, 2015

(54) SANDWICH STRUCTURE WITH A HIGH LOAD-BEARING CAPACITY, AS WELL AS METHODS FOR THE MANUFACTURE THEREOF

(75) Inventor: Martin Theodoor de Groot, Driebergen (NL)

(73) Assignee: FITS Holding B.V., Driebergen (NL)

( * ) Notice: Subject to any disclaimer, the term of this patent is extended or adjusted under 35 U.S.C. 154(b) by 920 days.

(21) Appl. No.: 12/299,872

(22) PCT Filed: May 7, 2007

(86) PCT No.: PCT/NL2007/000121
§ 371 (c)(1),
(2), (4) Date: Apr. 16, 2009

(87) PCT Pub. No.: WO2007/129886
PCT Pub. Date: Nov. 15, 2007

(65) Prior Publication Data
US 2009/0297758 A1  Dec. 3, 2009

(30) Foreign Application Priority Data
May 8, 2006 (NL) ..................................... 1031768

(51) Int. Cl.
*B29C 65/00* (2006.01)
*B31B 1/60* (2006.01)
(Continued)

(52) U.S. Cl.
CPC ......... *B29C 44/5636* (2013.01); *B29C 67/0011* (2013.01); *B29C 67/0044* (2013.01); *B29C 69/001* (2013.01); *B29D 99/0021* (2013.01); *B32B 27/00* (2013.01); *B32B 5/145* (2013.01);
(Continued)

(58) Field of Classification Search
USPC .............. 156/196, 60; 428/12–129, 156, 174, 428/178
See application file for complete search history.

(56) References Cited

U.S. PATENT DOCUMENTS 3,192,099 A   6/1965  Beckman et al.
4,744,467 A * 5/1988  Jonsson et al. ................ 229/249
(Continued)

FOREIGN PATENT DOCUMENTS

DE  38 13 104 A1  11/1989
DE  195 15 930 A1  11/1996
(Continued)

OTHER PUBLICATIONS

Search Report dated Mar. 29, 2007 for NL 1031768.
(Continued)

*Primary Examiner* — Richard Crispino
*Assistant Examiner* — Matthew Hoover
(74) *Attorney, Agent, or Firm* — Thomas|Horstemeyer, LLP

(57) ABSTRACT

A sandwich structure based on a composite panel made of a thermoplastic core layer connected to at least one fiber-reinforced thermoplastic layer, in particular in-situ manufactured sandwich panels, comprises a thermoplastic core, which is arranged between two cover layers, in which the core is reinforced with fiber-reinforced thermoplastic reinforcing ribs which extend between the cover layers. Preferred methods for the manufacture are also described.

5 Claims, 4 Drawing Sheets

(51) Int. Cl.
*B32B 37/00* (2006.01)
*B32B 5/00* (2006.01)
*B32B 7/00* (2006.01)
*B32B 3/04* (2006.01)
*B32B 3/00* (2006.01)
*B32B 1/00* (2006.01)
*B32B 3/12* (2006.01)
*B29C 44/56* (2006.01)
*B29C 67/00* (2006.01)
*B29C 69/00* (2006.01)
*B29D 99/00* (2010.01)
*B32B 27/00* (2006.01)
*B32B 5/14* (2006.01)
*B32B 5/18* (2006.01)
*B32B 5/20* (2006.01)
*B32B 27/06* (2006.01)
*B32B 27/28* (2006.01)
*B32B 3/08* (2006.01)
*B29C 47/00* (2006.01)
*B29C 47/02* (2006.01)
*B29K 105/04* (2006.01)
*B29K 105/06* (2006.01)
*B29L 7/00* (2006.01)
*B29L 9/00* (2006.01)
*B29C 47/06* (2006.01)

(52) U.S. Cl.
CPC ... *B32B 5/18* (2013.01); *B32B 5/20* (2013.01); *B32B 27/065* (2013.01); *B32B 27/281* (2013.01); *B32B 27/285* (2013.01); *B32B 27/286* (2013.01); *B32B 27/288* (2013.01); *B32B 3/08* (2013.01); *B32B 3/12* (2013.01); *B29C 47/0019* (2013.01); *B29C 47/003* (2013.01); *B29C 47/0033* (2013.01); *B29C 47/02* (2013.01); *B29C 2793/0081* (2013.01); *B29K 2105/04* (2013.01); *B29K 2105/06* (2013.01); *B29L 2007/002* (2013.01); *B29L 2009/00* (2013.01); *B32B 2250/40* (2013.01); *B32B 2266/0214* (2013.01); *B32B 2266/0257* (2013.01); *B32B 2307/54* (2013.01); *B32B 2307/546* (2013.01); *B32B 2307/706* (2013.01); *B32B 2419/00* (2013.01); *B32B 2605/18* (2013.01); *B29C 47/065* (2013.01)
USPC ............... 156/196; 156/60; 428/98; 428/156; 428/174; 428/178; 428/120; 428/121; 428/122; 428/123; 428/124; 428/125; 428/126; 428/127; 428/128; 428/129

(56) References Cited

U.S. PATENT DOCUMENTS

| | | | | |
|---|---|---|---|---|
| 5,296,065 | A | * | 3/1994 | Greatorex ..................... 156/196 |
| 5,547,737 | A | | 8/1996 | Evans et al. |
| 5,683,781 | A | * | 11/1997 | Komarek et al. ............. 428/116 |
| 2008/0176027 | A1 | * | 7/2008 | Pflug et al. .................... 428/116 |

FOREIGN PATENT DOCUMENTS

| | | | |
|---|---|---|---|
| DE | 196 12 127 A1 | 10/1997 | |
| DE | 197 15 529 C1 | 8/1998 | |
| DE | 297 12 684 U1 | 11/1998 | |
| EP | 0 431 669 A1 | 6/1991 | |
| EP | 0 636 463 A1 | 2/1995 | |
| EP | 636463 A1 * | 2/1995 | .............. B29C 44/14 |
| FR | 2 339 473 A1 | 8/1977 | |
| GB | 1 032 707 A | 6/1966 | |
| GB | 1 274 569 A | 5/1972 | |
| GB | 2 057 959 A | 4/1981 | |
| GB | 2 151 184 A | 7/1985 | |
| JP | 59 007014 A | 1/1984 | |
| NL | 7 000 282 A | 7/1970 | |
| WO | 97/03828 A | 2/1997 | |
| WO | WO 9703828 A1 * | 2/1997 | .............. B32B 31/04 |
| WO | 01/56780 A1 | 8/2001 | |

OTHER PUBLICATIONS

PCT Search Report dated Oct. 4, 2007.

* cited by examiner

Fig. 5
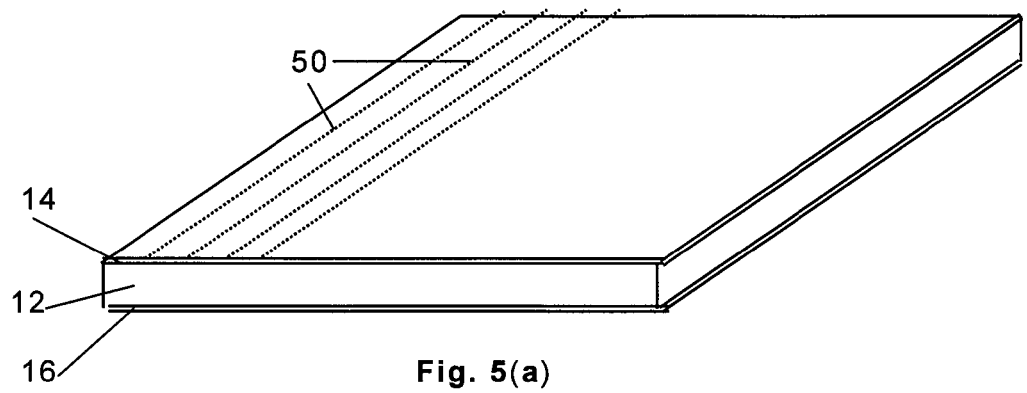
Fig. 5(a)
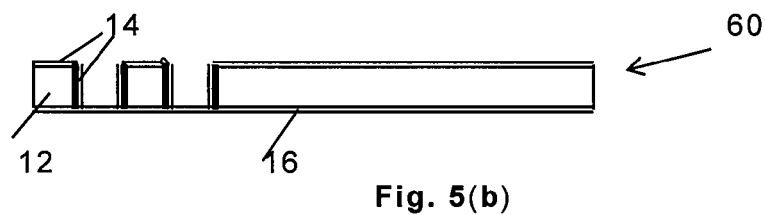
Fig. 5(b)
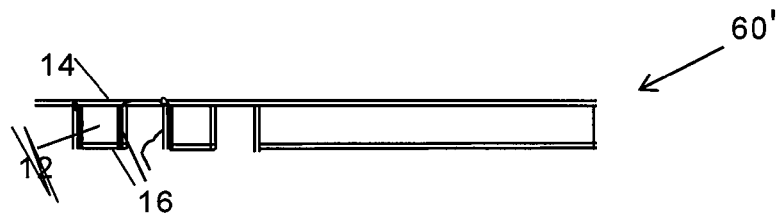
Fig. 5(c)
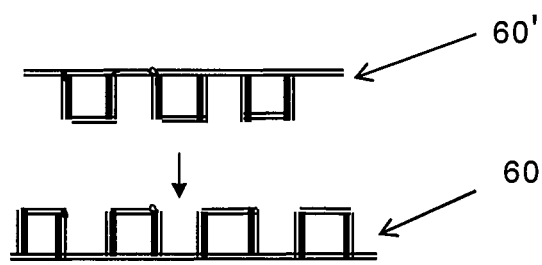
Fig. 5(d)
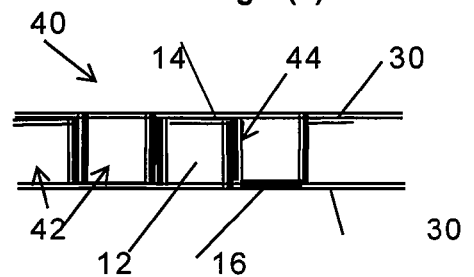
Fig. 5(e)

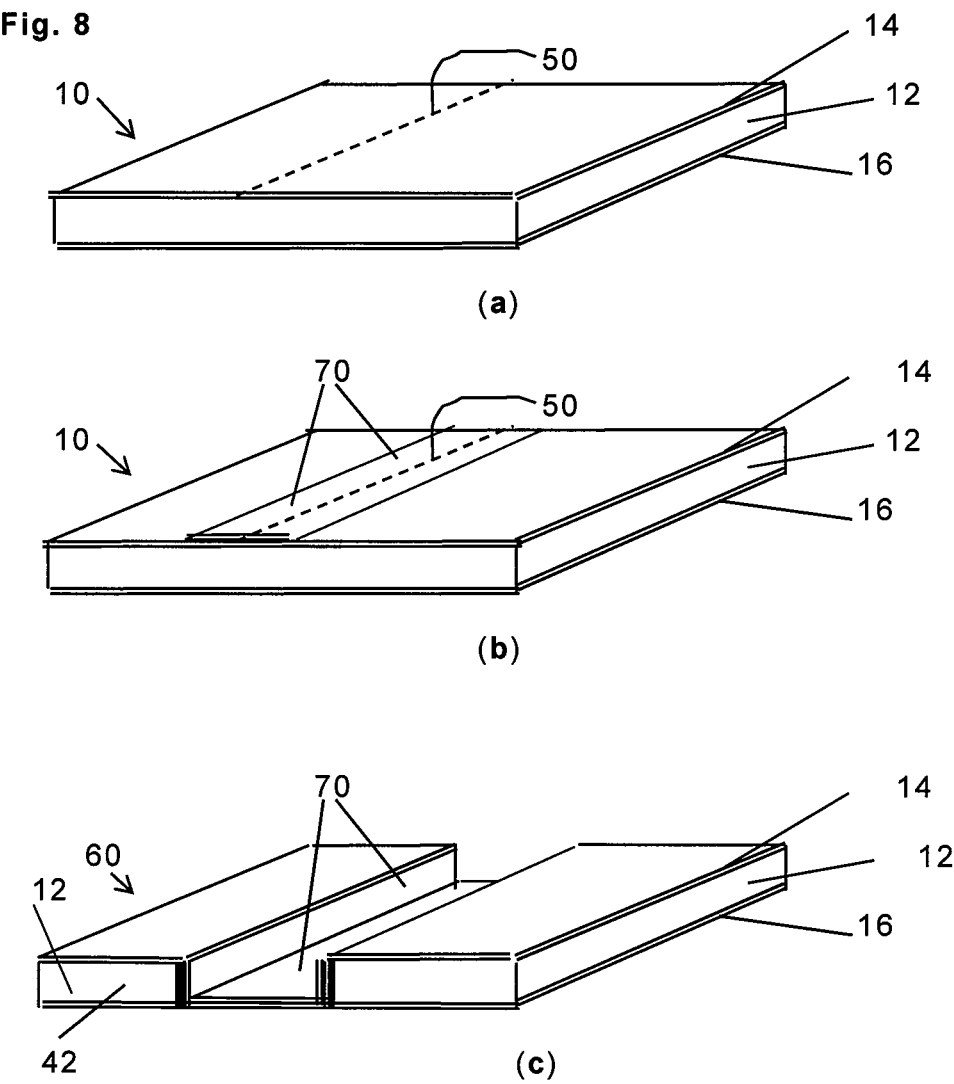
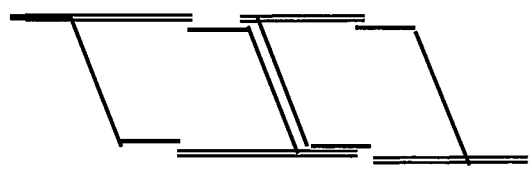
Fig. 9

SANDWICH STRUCTURE WITH A HIGH LOAD-BEARING CAPACITY, AS WELL AS METHODS FOR THE MANUFACTURE THEREOF

This application is the National Stage of International Application no. PCT/NL2007/000121 filed May 7, 2007, which claims the benefit of Netherlands patent application number 1031768 filed May 8, 2006, the contents of which are incorporated by reference herein.

FIELD OF THE INVENTION

The invention relates to a sandwich structure, and to methods for the manufacture thereof.

BACKGROUND OF THE INVENTION

Inter alia from EP-A-636463 by the Applicant, sandwich panels which have been manufactured in situ are known, which comprise a thermoplastic foam core layer which is connected to at least one—optionally fiber-reinforced—thermoplastic cover layer, as well as a method for the manufacture thereof. The term in-situ manufacturing is understood to mean forming the foam core layer in one step and connecting it to at least one cover layer in a press, starting from an assembly comprising a layer of a thermoplastic which is impregnated with a suitable physical blowing agent and comprises the at least one thermoplastic cover layer. This assembly is placed in a press and, once the material-dependent foaming temperature has been reached, the distance between the press platens is increased. Following cooling and drying, an in-situ manufactured sandwich panel is obtained. Because of their favorable strength and weight properties, such sandwich panels are particularly suitable for use in the transport sector, such as in aviation and space travel.

Nowadays, there are also thermoplastic sandwich panels which comprise at least one fiber-reinforced thermoplastic cover layer and a core layer made of a thermoplastic honeycomb structure. This honeycomb structure comprises essentially parallel open tubular elements made from a thermoplastic which are at right angles to the main surface of the fiber-reinforced thermoplastic cover layer.

With some intended uses of (thermoplastic) sandwich panels, the expected load is quite considerable and thus there is a need for construction elements of this type which have improved strength properties.

SUMMARY OF THE INVENTION

It is an object of the invention to provide a sandwich structure based on an assembly of at least one fiber-reinforced thermoplastic cover layer and a thermoplastic core layer, in particular of in-situ manufactured sandwich panels having improved strength properties, as well as methods for the manufacture thereof, or a usable alternative therefor.

To this end, the invention provides a sandwich structure based on a composite panel made of a thermoplastic core layer connected to at least one fiber-reinforced thermoplastic layer, in particular an in-situ manufactured sandwich panel, which structure comprises a thermoplastic core which is disposed between two cover layers, in which the core is reinforced with fiber-reinforced thermoplastic reinforcing ribs which extend between the cover layers. Due to the presence of the fiber-reinforced thermoplastic reinforcing ribs, which extend from the one cover layer in the direction of the other cover layer—in other words do not run parallel with the cover layers—in the core, the sandwich structure according to the invention has a higher (compression- or shear-) strength and bending stiffness than an in-situ manufactured sandwich panel, as a result of which the sandwich structure can be subjected to higher loads. The core thus consists of several parts, which are separated from one another by the reinforcing ribs. The core comprises a non-solid thermoplastic structure, e.g. a thermoplastic foam or a thermoplastic honeycomb. A thermosetting or thermoplastic adhesive, which may optionally be reinforced with fibers, may be used in order to connect the components of the thermoplastic sandwich structure. If possible, the thermoplastic which is present in the core, reinforcing ribs and cover layers will itself act as bonding agent, e.g. by hot-welding.

In the context of the present description, the term "composite panel" is understood to mean an object having a thickness which is small in comparison to its length and width, and which is composed of a thermoplastic core layer and at least one fiber-reinforced thermoplastic cover layer.

Furthermore, the expression "sandwich panel" in the present description refers to a particular embodiment of a composite panel, that is an object having a thickness which is small in comparison with the length and width of the object, and which is composed of a core which is disposed between two cover layers. The second cover layer does not necessarily have to comprise a fiber-reinforced thermoplastic, but may also comprise an optionally fiber-reinforced cover layer of another material, such as a metal plate or a (fiber-reinforced) thermosetting material layer.

A "thermoplastic sandwich panel" refers to a sandwich panel of this type, which is composed of a thermoplastic core layer and two fiber-reinforced thermoplastic cover layers.

An "in-situ manufactured sandwich panel" refers to a sandwich panel of this type, which has been produced by means of the above-described in-situ foaming technique, in other words a thermoplastic foam layer which is disposed between two fiber-reinforced thermoplastic cover layers.

Within the context of this application, "sandwich structure" refers to an object which also has a thickness which is small in comparison to its length and width, and which is composed of a thermoplastic core disposed between two cover layers, with fiber-reinforced thermoplastic fiber-reinforcing ribs likewise being provided between the cover layers, and being connected thereto.

Incidentally, it should be noted that DE19715529 discloses various sandwich structures for construction components for airplanes, which comprise a foam core and (fiber-reinforced) cover layers. In certain embodiments, the foam core is composed of segments, with each segment comprising foam-filled fiber bodies. These segments may be arranged in different configurations adjacent to one another, and thus form a row of segments. One or more rows of segments stacked on top of one another are arranged between two cover layers and connected thereto. This document also discloses a method for manufacturing such sandwich structures, in which the connection between the segments themselves and between the segments and the cover layers is produced—if desired via an additional fiber-reinforcing layer—by injecting an impregnating agent (resin) into a cover layer of the sandwich structure in such a manner that the agent also penetrates between adjacent segments in a row of segments, and subsequently allowing the impregnating agent to set. These known sandwich structures are said to have a compressive, shearing and bending strength and rigidity adapted to the loads.

Furthermore, DE19515930 discloses a similar sandwich structure in which foam-filled extruded sleeves are arranged next to one another and connected to one another to form a core, which can be accommodated between cover layers in order to form the sandwich.

Other similar sandwich structures which comprise a (foam)core between cover layers, with reinforced connecting ribs which extend between the cover layers in the core, are known, inter alia, from U.S. Pat. No. 5,547,737.

The specific problems associated with thermoplastic sandwich panels, sandwich structures and the manufacture thereof is not mentioned in these publications.

Advantageously, with the sandwich structure according to the invention, the reinforcing ribs are at right angles to the main surfaces (cover layers) thereof. Other directions of the reinforcing ribs, insofar as these extend between the cover layers, are possible and are partly determined by the load which is expected to occur during the intended use.

In one preferred embodiment of a sandwich structure according to the invention, the core comprises segments which are arranged adjacent to one another, a segment advantageously being manufactured from a thermoplastic sandwich panel, preferably an in-situ manufactured sandwich panel which comprises a thermoplastic core body, preferably a foam body, which is covered on at least one surface with a fiber-reinforced thermoplastic layer. Such segments which generally have a relatively great length in comparison to the width and/or thickness may be obtained from an in-situ manufactured sandwich panel by simple deformation steps, as will be explained in more detail below.

The shape of such a segment is not limited. Examples—viewed in cross section—vary from round, oval, polygonal, triangular, parallelogram, rectangular to square, and combinations thereof. In view of the above-described preferred direction of the reinforcing ribs, segments with rectangular or square cross sections are preferred.

Such segments may in themselves also be used as lightweight boards, reinforcing beams, door posts, jambs for windows and doors, etc. Thus, the invention also relates to a construction element comprising an elongate thermoplastic foam body which is covered, at least on the longitudinal sides, with a fiber-reinforced thermoplastic layer. Advantageously, the construction element has a rectangular cross section. For coupling purposes, the construction element preferably has a tapered end.

In a further preferred embodiment, a segment comprises a foam body with a rectangular cross section, with at least four sides of the foam body being covered by a fiber-reinforced thermoplastic layer. Thermoplastic (sub)layers and any added reinforcing layers thereof may in this case overlap one another or abut one another.

If the foam is an anisotropic foam with elongate cells, as is the case with an in-situ manufactured sandwich panel, the segments are advantageously arranged in such a manner that the length direction of the foam cells extends in the thickness direction of the structure, in other words is at right angles to a main surface of the structure. In this advantageous embodiment, the orientation of the cells supports the presence of the reinforcing ribs with respect to the compressive strength. Similarly, this is also true for a thermoplastic honeycomb structure in the core.

According to another preferred embodiment, the sandwich structure according to the invention comprises an assembly of at least two subpanels, each subpanel comprising a (preferably thermoplastic, more preferably fiber-reinforced thermoplastic) cover layer, which is provided on at least one side with thermoplastic core parts which are arranged at a distance from one another and which, on at least two sides and preferably on all sides, are covered with a fiber-reinforced thermoplastic cover layer, the subpanels being connected to one another in such a manner that the core parts of a subpanel are situated in a position between the core parts of another subpanel.

Sandwich panels are often formed as flat panels, preferably in accordance with standard dimensions customary in the industry. In contrast with the above-described embodiments based on separate segments, this preferred embodiment of the invention leaves the panel-like nature of the starting materials in the form of panels essentially intact. The preferably complementary subpanels which can advantageously be produced by local deformation under the effect of heat and pressure in a simple manner from a sandwich panel, preferably a thermoplastic sandwich panel, in particular an in-situ manufactured sandwich panel, can be connected to one another, for example by means of a thermosetting adhesive, following positioning. In this embodiment, the reinforcing ribs may not only extend essentially parallel to one another between the cover layers, but in several directions, preferably at right angles to one another, which results in a further improvement in the strength and/or stiffness properties compared to a traditional panel, comprising at least one thermoplastic cover layer and a thermoplastic foam core.

Depending on, inter alia, the distance between the core parts, and their shape and dimensions, an additional fiber-reinforced thermoplastic layer (which is also referred to as reinforcing layer below) is advantageously provided, at least between neighboring core parts of a subpanel. A continuous reinforcing layer which extends over several core parts can also be used. As in this embodiment the reinforcing ribs are usually formed from a cover layer of the starting material, it may be necessary to add at least one additional layer when manufacturing a subpanel, in order to achieve the same overall thickness of the fiber-reinforced cover layers (except for the local reinforcing ribs) across the entire surface area. The dimensions of the reinforcing layer, the number of reinforcing layers and the nature of the materials thereof, including the fiber reinforcement, can be tailored to the specific requirements of the intended use.

In the above embodiments, the top and bottom cover layers of the sandwich structure are uninterrupted.

Another sandwich structure according to the invention is completely made up of elongate segments, which segments comprise a thermoplastic core body having a fiber-reinforced thermoplastic cover layer on its longitudinal sides, the top side and the bottom side being provided with connecting flanges extending parallel to the top side and bottom side and made from a fiber-reinforced thermoplastic cover layer. In this case, the top and bottom cover layers of the sandwich structure are composed of cover layer parts of the individual segments, which cover layer parts are connected to one another by means of the connecting edges.

The sandwich structure according to the invention can be manufactured in a variety of ways. The invention also looks upon preferred methods for the manufacture of a preferably thermoplastic sandwich structure according to the invention, comprising a thermoplastic core which is arranged between two (preferably thermoplastic, more preferably fiber-reinforced thermoplastic) cover layers, in which the core is reinforced with fiber-reinforced thermoplastic reinforcing ribs which extend between the cover layers, said method comprising the following steps:
  a) providing a composite panel made of a thermoplastic core layer which is connected to a fiber-reinforced thermoplastic layer;
  b) folding at least one edge of the composite panel over a length which is at least equal to the thickness of the panel, so that a segment is obtained which is covered on at least two adjacent surfaces with a fiber-reinforced thermoplastic layer;

c) repeating steps a) and b) until the desired number of segments is obtained;

d) arranging a number of segments next, preferably adjacent, to one another between two (preferably thermoplastic, more preferably fiber-reinforced thermoplastic) cover layers, in such a manner that each segment touches at least one of the two cover layers, preferably also an adjacent segment; and e) connecting the cover layers to the segments.

The methods according to the invention including the alternative preferred method to be discussed below make it possible to obtain a thermoplastic sandwich structure with improved strength properties, as has been described above. Since the core layer of the composite panel is made from a thermoplastic material, it can easily be compacted to form a compact mass of very small dimensions by local heating to the melting point ±20° C. and applying pressure, while the thermoplastic cover layer can easily be deformed by applying pressure and by being exposed to a sufficiently high temperature (near the glass transition temperature). A hot deformation ram is a suitable tool which can be used to this end. If desired, the core part which is to be compacted in another way may also be removed beforehand. As has been mentioned above, additional (fiber-reinforced) thermoplastic layers may be added as reinforcing layers, preferably in such a manner that these also extend in the thickness direction in the finished sandwich structure. Preferably, step a) comprises the in-situ formation of a thermoplastic sandwich panel comprising two fiber-reinforced thermoplastic cover layers with a thermoplastic foam layer inbetween, which panel is optionally divided into (rectangular) sections of suitable dimensions. Preferably, such a panel or section thereof is folded along two parallel edges, in such a manner that a segment which is covered on at least four sides is obtained. Advantageously, step b) comprises folding the two edges from opposite sides of a panel or section. In order to obtain particularly strong reinforcing ribs, in a further preferred embodiment, step b) comprises folding the edges from the same side of a panel or section followed by folding the edges from the opposite side, so that the edges folded from different sides overlap to some degree. As a result of this measure, the covered sides of a segment which have been formed by folding, have a double covering of fiber-reinforced thermoplastic material, which will later serve as reinforcing ribs. If desired, additional reinforcing layers may also be added on one side, on both sides or on all sides in step b). In step d), the segments can be arranged as a row of segments adjoining one another or at a certain distance from one another. If segments adjoin one another, the segments are also connected to one another in step e). When the segments are arranged at a distance from one another, the intermediate open spaces can be used as flow passages for a fluid, for example as an air-cooling passage. Such flow passages may also be formed by holes in one or more corners or recesses in the segments. The segments, which may optionally adjoin one another, may be stacked on top of one another in several rows.

In an alternative method for manufacturing a sandwich structure comprising a thermoplastic core which is arranged between two cover layers, in which the core is reinforced with fiber-reinforced thermoplastic reinforcing ribs which extend between the cover layers, subpanels are manufactured first. To this end, the method comprises the following steps:

f) providing a sandwich panel, preferably a thermoplastic sandwich panel, more preferably an in-situ manufactured thermoplastic sandwich panel, comprising a thermoplastic core layer which is arranged between two cover layers, at least one of which is a fiber-reinforced thermoplastic cover layer;

g) providing one or more interruptions in the fiber-reinforced thermoplastic cover layer of the panel;

h) folding edges of the cover layer which are situated along an interruption, so that a subpanel is obtained comprising a cover layer, which is provided with core parts which are arranged at a distance from one another, which are covered on at least two sides with a fiber-reinforced thermoplastic cover layer;

i) repeating steps f)-h) at least once until the desired number of subpanels has been manufactured;

j) positioning at least two subpanels in such a way with respect to one another that the core parts of a subpanel are at a position between the core parts of another subpanel; and k) connecting the subpanels to one another.

The term "interruption" in this context refers to an interruption in the fiber structure of the fiber-reinforced thermoplastic layer. An interruption of this kind can be produced by means of any kind of tool, such as a knife, laser, miller or saw. The interruption may optionally, in addition to the interruption of the fiber structure, be accompanied by the removal of a part, for example a strip of the thermoplastic fiber-reinforced cover layer and/or thermoplastic core. If the underlying core is not removed, then this will be compacted locally during step h) as a result of the pressure and heat exerted during folding or bending.

In a preferred embodiment, the interruptions, also referred to as incisions, are provided parallel to one another and at a distance from one another in step g), resulting in a sandwich structure with reinforcing ribs which run parallel to one another.

In yet a further preferred embodiment, the interruptions in the subpanels are produced in complementary patterns in step g), so that, in the finished sandwich structure, the core parts of a subpanel adjoin and are also connected to the foam core parts of another subpanel via the reinforcing ribs.

Advantageously, in step h), the edges of the thermoplastic sandwich panel which are situated along an interruption are folded over a length which is at least equal to the thickness of the panel. The result thereof is that the folded part of the fiber-reinforced cover layer can also be connected to the other cover layer during step k), thus resulting in a strong construction of the sandwich structure.

As the dimensions of the surface of the original fiber-reinforced thermoplastic cover layer in which the interruptions are made, are often insufficient to cover the lateral faces of the core parts formed by folding as well (in other words to form the reinforcing ribs completely), it is advantageously possible to arrange additional fiber-reinforced thermoplastic layer parts (reinforcing layers) over and/or near the interruptions. Again, the dimensions of the reinforcing layer, the number of reinforcing layers and the nature of the starting materials thereof, including the fiber reinforcement, can be tailored to the specific requirements of the intended use. For example, the dimensions of the reinforcing layer can be selected to be such that the reinforcing layer not only covers the bottom and sides of the recess provided between the core parts, but also extends over non-deformed parts of the fiber-reinforced thermoplastic cover layer next to the recess.

Since the surfaces of the subpanels to be connected are not readily accessible, a thermosetting adhesive is preferably used in this step k). The subpanels can also be used individually, e.g. as corrugated sheets for roofs, walls for reservoirs, etc. Furthermore, the recesses or spaces in the subpanels may be filled with one or more segments, following which a further cover layer may also be applied on top. Depending on the shape of the recess and the desired degree of filling, the latter may also be effected by means of subsegments, such as small rectangular blocks, cylinders, etc.

One method for manufacturing a thermoplastic sandwich panel with a thermoplastic foam core by means of in-situ foaming is known, for example, from EP-A1-0636463, as has already been described above.

Such a known in-situ foamed sandwich panel consists of a foamed core layer, which is covered with two fiber-reinforced thermoplastic cover layers. A cover layer comprises one or more (fiber-reinforced) thermoplastic materials. The in-situ foaming process consists of several steps. The first step is an assembly step, during which a core web, which comprises at least one film made of thermoplastic material, which material contains a certain amount of a suitable physical blowing agent, is positioned between, for example, two (fiber-reinforced) cover layers, which are usually made of the same thermoplastic material as the core web. Subsequently, the assembly of core web and cover layers is placed between two press platens in a press. In this position, a foaming step is performed, in which heat and pressure are added to the assembly first via the press platens, so that a connection between the core web and the cover layer or cover layers is produced. Then, during a foaming step, when the temperature has reached a sufficiently high level, the press is slowly opened, as a result of which the distance between the two press platens increases. This allows the blowing agent (swelling agent, solvent, chemical blowing agent and/or physically inert gas) to expand, as a result of which the material of the core web starts to foam. This expansion is usually carried out under controlled conditions. In this way, the core web is foamed, and the connection between the core web and the cover layer or layers is produced in one manufacturing step without a separate or additional adhesive being required. Once a predetermined thickness of the foamed core web has been achieved, the assembly is allowed to cool off during a cooling step. The product obtained in this way comprises the foamed core web which is covered by two thermoplastic cover layers and connected thereto. In addition, a drying step is usually carried out.

Examples of swelling agents for a core layer comprising thermoplastic foam, include, amongst others, acetone, methyl ethyl ketone, methyl acetate, methyl propionate, nitro ethane, cyclohexane, ether, ethanol, methanol and pentane, as well as mixtures, such as ethanol/acetone and methanol/methyl acetate. Acetone is a preferred swelling agent.

Examples of suitable thermoplastics for both the core layer and the matrix for the fiber-reinforced cover layers comprise polyetherimide (PEI), polyethersulfone (PES), polysulfone, polyvinylsulfone (PPSU), polyketone, such as polyetheretherketone (PEEK), liquid crystal polymers, polycarbonate (PC), propylene (PP), polyethylene (PE), polyvinyl chloride (PVC), etc., as well as combinations thereof. Polyetherimide is a preferred thermoplastic. The latter is available in different grades from General Electric under the brand name UItem. Glass fibers are preferred as reinforcement. Other inorganic fibers, such as metal fibers, carbon fibers and organic fibers, such as aramide fibers can be used in a similar manner, provided they can be deformed to a sufficient degree in order to form the reinforcing ribs. It is also possible to use natural fibers, in addition to the abovementioned synthetic fibers. The fibers can be used in the form of mats, fabrics and the like. Directional fibers, in particular unidirectional fibers where the fiber direction is matched to the intended use, can also be used advantageously. The core layer, e.g. thermoplastic honeycomb or preferably thermoplastic foam may optionally be reinforced with fibers of the abovementioned types or with nano particles. Preferably, the thermoplastic material of the core layer is the same as the thermoplastic material in the cover layers. However, it is also possible to use combinations of different thermoplastics. Suitable examples thereof include, inter alia, PEI foam covered with cover layers made of PPSU, PS, PEEK or PC, PES or PPSU foam covered with PPSU or PC cover layers, and PP foam covered with polyamide, such as nylon cover layers.

The abovementioned examples are similarly true for the additional reinforcing layers. These may, for example, be used as consolidated layer or as prepreg, which may consist of several layers (laminates) which are stacked on top of one another.

If desired, the core may also consist of several layers, which are separated by an intermediate layer, such as an optionally fiber-reinforced (thermoplastic) layer, ceramic layer or metal layer.

Other methods for manufacturing an assembly comprising a thermoplastic core and at least one fiber-reinforced thermoplastic cover layer include, inter alia, extruding a thermoplastic foam or thermoplastic honeycomb onto a fiber-reinforced thermoplastic cover layer, preferably between two such cover layers, and gluing a thermoplastic core layer to a fiber-reinforced thermoplastic cover layer. In general, the adhesive used should be able to withstand the temperatures required for deformation.

If desired, an outer fiber-reinforced layer which has not been impregnated with plastic may be applied to a segment or sandwich structure, which outer fiber-reinforced layer is then injected with resin (vacuum injection), so that a double bond is achieved, i.e. adhesion between the injected resin and the thermoplastic, on the one hand, and permeation of the dry fiber-reinforced layer, which is partially connected to the thermoplastic, on the other hand.

BRIEF DESCRIPTION OF THE DRAWINGS

The invention will be described in more detail below with reference to the attached drawing, in which:

FIGS. 5(a)-(e) diagrammatically show another embodiment of a method for manufacturing a sandwich structure from subpanels according to the invention;

FIGS. 8(a)-(c) show yet another embodiment of a method for manufacturing a subpanel; and FIG. 9 shows a sandwich structure according to the invention composed of segments which have been coupled together.

DESCRIPTION OF THE PREFERRED EMBODIMENTS

Figure 1:
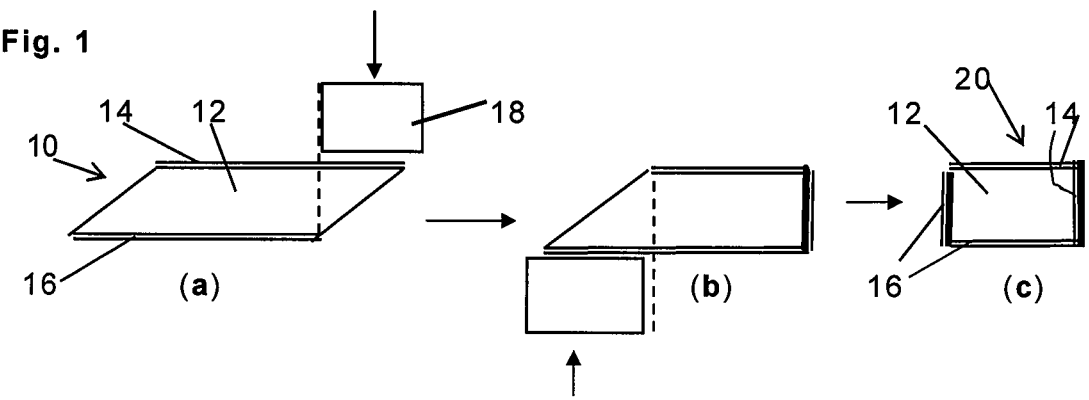
FIGS. 1(a)-(c) diagrammatically show a method for manufacturing a thermoplastic foam segment which is covered on four sides with a fiber-reinforced thermoplastic cover layer.

FIG. 1 diagrammatically shows an example of an embodiment of a method for manufacturing a segment which comprises a foam core which is covered on four sides. Such a segment may be used separately, but may also be used in the method for manufacturing a sandwich structure according to the invention.

FIG. 1(a) shows a cross section of a thermoplastic sandwich panel 10, which comprises an in-situ foamed foam core layer 12, which is covered on the top and bottom sides with fiber-reinforced thermoplastic cover layers 14 and 16, respectively. In a first step, the right-hand side, as illustrated in FIG. 1(a), is deformed from above using a hot molding stamp 18, as a result of which the respective edge section of the top cover layer 14 is folded over up to the bottom cover layer 16, with the heat compacting the respective section of the foam core layer 12. The boundary between the deformed section and the non-deformed section is referred to below as "folding line" and is illustrated in the figure as a dashed line. In a subsequent step, the left-hand edge of the bottom cover layer 16 is now folded over from the bottom (see FIG. 1(b)), resulting in an elongate segment 20 with rectangular cross section, which comprises the foam core layer 12, which is covered on four sides with a fiber-reinforced thermoplastic cover layer 14 and 16, respectively. See FIG. 1(c).

FIGS. 2(a)-(c) show an alternative method, starting from a thermoplastic sandwich panel 10, in which the lateral faces of the segment are covered with the fiber-reinforced thermoplastic cover layer by first folding over the top cover layer 14 at two opposite edges using a molding stamp 18 in the manner described with reference to FIG. 1, and subsequently the bottom cover layer 16. Thus, a segment 20 is created, which again comprises a foam core layer 12, the top and bottom 22 and 24, respectively, of which are covered with a fiber-reinforced thermoplastic cover layer 14 and 16, respectively, and the lateral faces 26 with a double fiber-reinforced thermoplastic cover layer 14 and 16. If desired, additional fiber-reinforced thermoplastic reinforcing layers 70 may be applied during or after folding. Depending on the thickness of the panel, it may be desirable to remove the core layer up to or up to and including the folding line or at least a part thereof, before bending or folding the cover layer edges.

Figure 3:
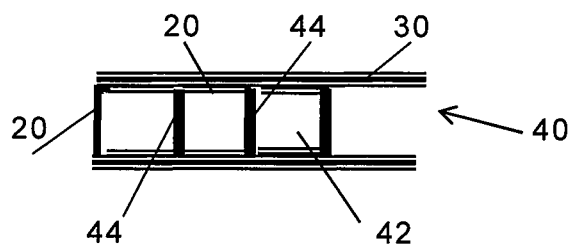
FIG. 3 diagrammatically shows a sandwich structure made from the segments according to FIG. 1 or 2.

FIG. 3 shows how a series of segments 20 are arranged with the lateral faces 26 adjacent to one another between two fiber-reinforced thermoplastic cover layers 30. The entirety is connected with the aid of an adhesive, a connection being achieved both between adjacent thermoplastic cover layers 14, 16 of adjacent segments 20 and between the cover layers 14, 16 of the segments 20 and the cover layers 30. The sandwich structure 40 obtained in this manner comprises thermoplastic foam core parts 42 originating from the foam core 12 of the segments 20, which are separated from one another by reinforcing ribs 44 made of fiber-reinforced thermoplastic originating from the original cover layers 14 and 16, and which foam core parts 42 are accommodated on the top and bottom side between the cover layers 30.

In the explanation given above, rectangular segments are used. Obviously, other shapes are also possible, such as triangles whose tip alternately points upwards or downwards, resulting in a sandwich structure, with the reinforcing ribs forming saw teeth, as it were.

Figure 4:
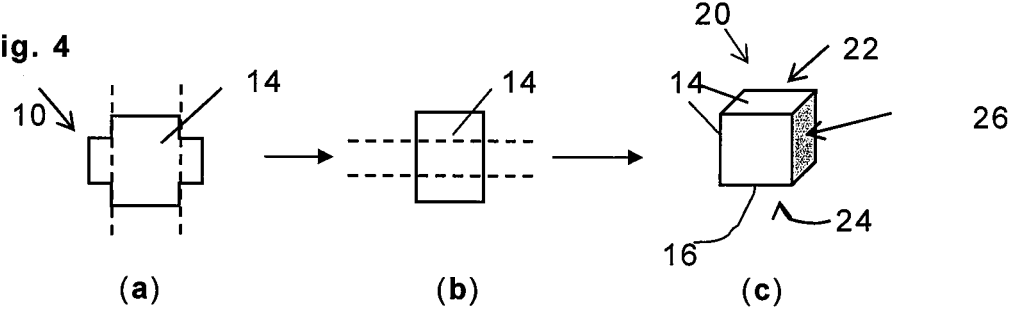
FIGS. 4(a)-(c) diagrammatically show an alternative method for manufacturing a segment covered on all sides with cover layers.

FIGS. 4(a)-(c) diagrammatically illustrate a method, which can be used for manufacturing segments covered on all sides and, depending on the length of the segment, for manufacturing cube-shaped blocks. To this end, the four corners are removed from a rectangular sandwich panel 10 or a section thereof, as illustrated in FIG. 4(a), following which the respective edges are successively folded over along the folding lines indicated by dashed lines. Thus, a (block-shaped) segment 20 is created, which is covered on all sides 22 (top), 24 (bottom), 26 (side) with a fiber-reinforced thermoplastic cover layer 14 or 16. Block-shaped segments can, for example, be used as local reinforcing elements.

Figure 2:
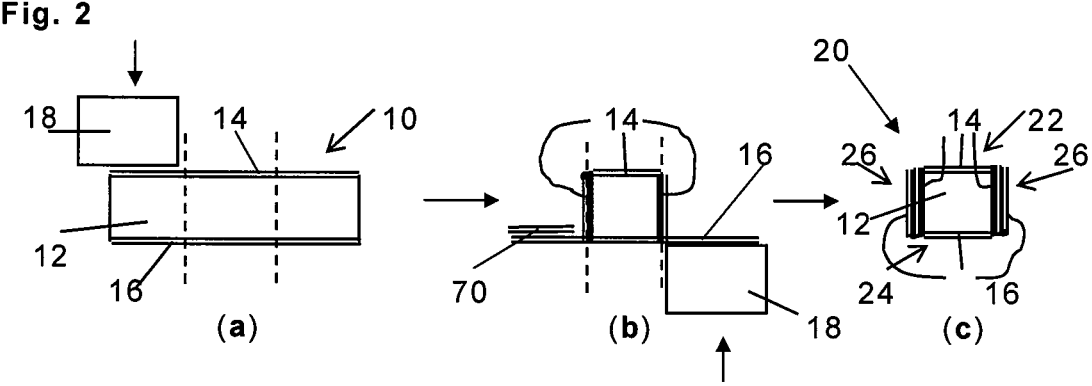
FIGS. 2(a)-(c) diagrammatically show an alternative method for manufacturing such a segment.

The next FIGS. 5(a)-(e) show the steps of an alternative method for manufacturing a sandwich structure according to the invention. A sandwich panel 10 comprises a foam core layer 12 between two fiber-reinforced thermoplastic cover layers 14 and 16, respectively. The top cover layer 14 is cut (see FIG. 5(a)), so that parallel lines of cut 50 (illustrated by a dotted line) are created as interruptions of the fiber structure in the length direction of the sandwich panel. In a subsequent step, the edges of the incisions are folded over, for example using a hot stamp, as is illustrated in FIGS. 1 and 2, followed by consolidation using a consolidation stamp, in such a manner that the folded sections of the cover layer 14 extend up to the other cover layer. See the subpanel 60 in FIG. 5(b), which comprises a flat cover layer 16, to which strip-shaped foam core parts 42 are applied on one side, and the other sides of which (except the head end), i.e. the top side 22 and lateral faces 26, are covered with parts of the top cover layer 14. Another sandwich panel is cut in a similar manner and deformed to form a subpanel 60', as defined above. See FIG. 5(c). The two subpanels 60 are then positioned in such a manner with respect to one another that the foam core parts 42 of one subpanel 60 engage in recesses between the foam core parts 42 of the other panel 60'. In general, the subpanels 60, 60' are connected to one another with the aid of an adhesive (and/or of heat and pressure), inter alia via the deformed thermoplastic cover layers 14, 16. Thus, a sandwich structure 40 is created with cover layers 30 which are made locally (in this case alternately on the top and the bottom side) of double cover layers 14 and 16 of the subpanels 60, 60', as well as double reinforcing ribs 44 which extend from the top cover layer 30 to the bottom cover layer 30. In this embodiment, the reinforcing ribs 44 are also made from the original cover layers 14 and 16. It will be understood that, inter alia depending on the thickness of a sandwich panel 10 and the distance between the cutting lines 50, it may be necessary, before forming the foam core parts, to provide one or more additional fiber-reinforced thermoplastic layers over or near the cutting lines, which are deformed and folded at the same time during the subsequent folding operation or deformation. See also FIG. 8. By modifying the shape of the recesses and thus of the core parts, it is also possible to produce a curved subpanel or a curved sandwich structure.

Figure 7:
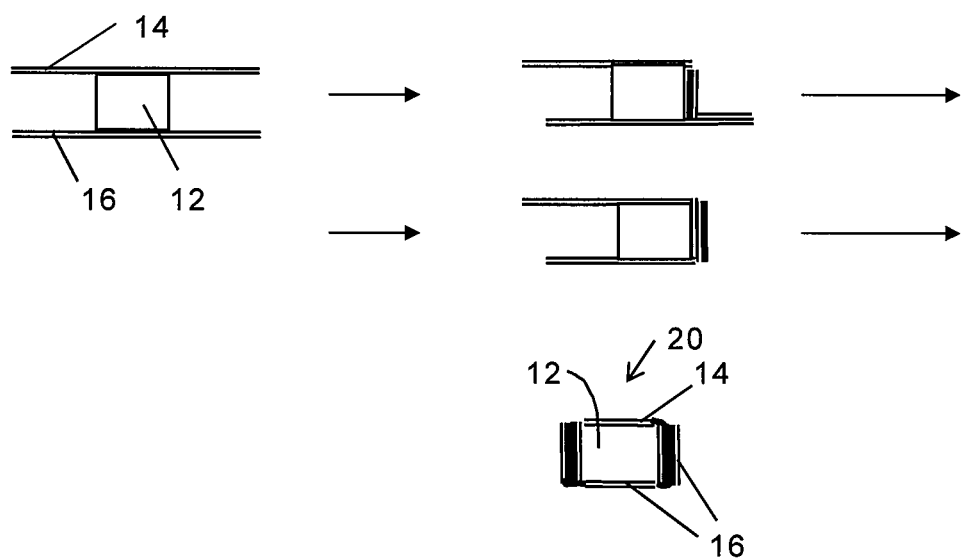
FIG. 7 shows yet another embodiment of a method for manufacturing a segment in a diagrammatical way.

It will be understood that the recesses can also be filled with individual segments, such as for example those according to FIGS. 1, 2 and 7. If necessary, an additional thermoplastic reinforcing layer may be provided on top, which is optionally provided with fiber reinforcement.

Figure 6:
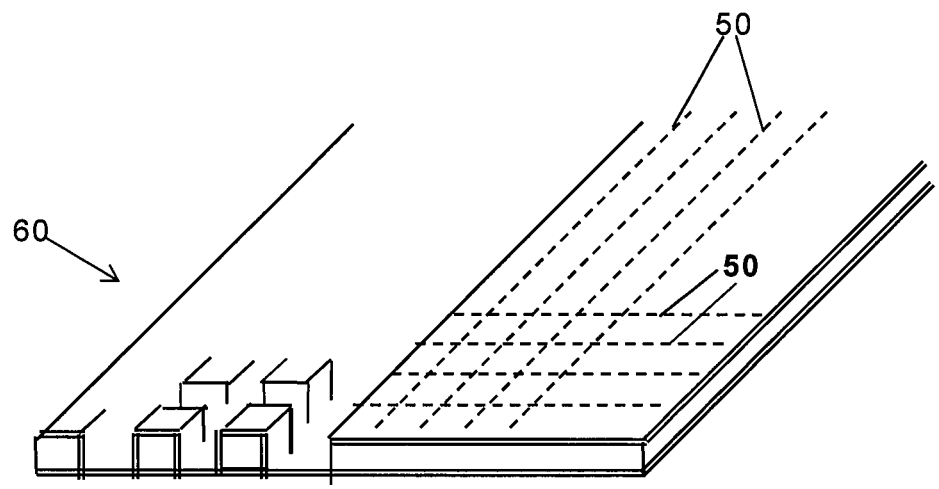
FIG. 6 diagrammatically and in cross section shows another embodiment of a subpanel which may be used with the method according to the invention.

FIG. 6 shows a subpanel 60 partially in cross section, in which the top cover layer 14 is cut in both the length and the width direction, with a number of edges already having been folded over along cutting lines 50. In the intermediate panel formed in this way, it is for example possible to accommodate block-shaped segments 20 according to FIG. 4, and covered with a (fiber-reinforced) cover layer.

FIG. 7 shows yet another alternative method for forming segments. In this case, a thermoplastic foam strip 12 is placed between two fiber-reinforced thermoplastic cover layers 14, 16 which extend in at least two directions beyond the foam strip 12. This starting material can also be obtained by partially removing the (foam)core of a sandwich panel or part thereof from the sides. In subsequent steps, the protruding parts of the cover layers 14, 16 are folded along the lateral faces of the foam strip and, depending on the length of the protruding parts, folded again, if desired. Such segments 20 can be used for manufacturing a sandwich structure as illustrated in FIG. 3. A segment can also be manufactured from a core, which is covered with a thermoplastic cover layer, preferably on four sides.

As illustrated in FIGS. 8(*a*)-(*c*), it is possible, if desired, to lay an additional fiber-reinforced thermoplastic layer 70 over a cutting line 50, following which the underlying foam structure is compacted with a hot deformation stamp and the cover layers are folded over to form edges of the foam core parts. See subpanel 60 in FIG. 8(*c*).

FIG. 9 shows two segments which are coupled together and consist of a thermoplastic core 12, which is provided on the longitudinal sides, i.e. the top side and the bottom side, with a fiber-reinforced thermoplastic cover layer 14 and 16, respectively, each of which also covers a longitudinal side, and also at least one protruding edge of the other cover layer and form a coupling part 100 in that position. The protruding coupling parts 100 are parallel to the respective bottom and top side, which are partially also tapered in order to compensate for the thickness of a coupling part. Such a segment can, for example, be manufactured in the way illustrated in FIGS. 1, 2 and 7, with the modification that the folded parts have a length which is greater than the thickness of the starting sandwich panel.

What is claimed is:

1. A method for manufacturing a sandwich structure comprising a thermoplastic core, which is arranged between two cover layers, in which the thermoplastic core is reinforced with fiber-reinforced thermoplastic reinforcing ribs, which extend between the cover layers, which method comprises the following steps:
    a) providing a composite panel, made of a thermoplastic core layer, which is connected to a fiber-reinforced layer, the fiber reinforced layer comprising a thermoplastic material and having at least one edge;
    b) folding at least one edge of at least the fiber-reinforced layer of the composite panel over a length which is at least equal to the thickness of the composite panel, so that a segment of the composite panel is obtained which is covered on at least two adjacent surfaces with the fiber-reinforced layer, the folding being performed using heat and pressure, wherein at least the fiber-reinforced layer is heated to a temperature higher than a glass-transition temperature of the thermoplastic material of the fiber-reinforced layer;
    c) repeating steps a) and b) at least once such that at least two segments of the composite panel are obtained;
    d) arranging at least two of the segments next to one another between two cover layers in such a manner that each of the at least two segments touches at least one of the two cover layers and such that the fiber-reinforced layer of at least one of the segments is positioned between the at least two segments and forms a fiber-reinforced thermoplastic reinforcing rib of the sandwich panel; and
    e) connecting the cover layers to the at least two segments to form the sandwich structure.

2. The method as claimed in claim 1, in which step a) comprises the in-situ foaming of a thermoplastic sandwich panel.

3. The method as claimed in claim 1, in which the fiber-reinforced layer comprises at least two edges and step b) comprises folding the at least two edges of at least the fiber-reinforced layer over opposite sides of the composite panel.

4. The method as claimed in claim 1, in which at least two fiber-reinforced layers are provided in step a), each fiber-reinforced layer having at least two opposed edges and step b) comprises folding at least one edge of each of the at least two fiber-reinforced layers from the same side of the composite panel, followed by folding at least one opposed edge of each of the at least two fiber-reinforced layers from an opposite side of the composite panel.

5. The method as claimed in claim 1, in which step b) comprises folding all edges of the composite panel, in such a manner that the segments are covered on all sides with the fiber-reinforced layer.

* * * * *